United States Patent
Eslambolchi et al.

(10) Patent No.: US 6,676,090 B1
(45) Date of Patent: Jan. 13, 2004

(54) HANGING APPARATUS FOR SLACK FIBER OPTIC CABLE

(75) Inventors: Hossein Eslambolchi, Los Altos Hills, CA (US); John Sinclair Huffman, Conyers, GA (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 10/002,040

(22) Filed: Nov. 2, 2001

(51) Int. Cl.[7] .................................................. F16L 3/00
(52) U.S. Cl. .......................................... 248/49; 248/121
(58) Field of Search ................................. 248/121, 126, 248/127, 49; 242/129.62, 137.1; 174/93

(56) References Cited

U.S. PATENT DOCUMENTS

| | | | | |
|---|---|---|---|---|
| 2,919,878 A | * | 1/1960 | Nathan | |
| D227,741 S | * | 7/1973 | Kim | |
| 5,188,308 A | * | 2/1993 | Tussing | 242/86.5 OR |
| 5,222,683 A | * | 6/1993 | Blackshire | 242/137.1 |
| 5,330,120 A | * | 7/1994 | Tussing | 242/588.2 |
| 5,456,959 A | * | 10/1995 | Dawes | 174/93 |
| 5,535,298 A | | 7/1996 | Fasnacht et al. | |
| 5,752,679 A | * | 5/1998 | Thomason | 248/49 |
| 6,409,128 B1 | * | 6/2002 | Deshler | 248/127 |
| 6,422,504 B1 | * | 7/2002 | Elder | 242/594.6 |

FOREIGN PATENT DOCUMENTS

DE        3423184        * 6/1984

* cited by examiner

Primary Examiner—Gwendolyn Baxter

(57) ABSTRACT

A bracket for supporting spare fiber optic cable includes a pair of parallel, spaced-apart cross arms supported by a center post, where the center post may then be attached to the floor of a manhole, or other location used to store spare fiber cable. The spare cable is then wound around the cross arms and available for later use. The hanging bracket is located in the manhole such that the cross arms face the cable conduits in the sidewalls of the manhole, allowing the fiber to be easily pulled through the conduit as it unwinds from the bracket, eliminating the problem of kinks in the cable as it is pulled.

4 Claims, 3 Drawing Sheets

HANGING APPARATUS FOR SLACK FIBER OPTIC CABLE

TECHNICAL FIELD

The present invention relates to hanging apparatus for slack fiber optic cable and, more particularly, to an "H"-shaped bracket for maintaining a coil of spare fiber in an enclosed location, such as a manhole.

BACKGROUND OF THE INVENTION

During installation of fiber optic cable routes, the fiber cables are installed in reel lengths that range from 10,000 feet to over 16,000 feet. At the termination of these reel lengths along the cable right of way, the fiber cables need to be spliced together to maintain continuity of the signals propagating along the individual fibers. Extra length of fiber cable is usually left at the ends of the fiber cables to allow enough of the cable to be maneuvered and is used to splice the two ends together. In most casts, 25 to 30 feet of spare cable is left at this splice location. At these points, most communication companies it will install a manhole that will house the extra length of fiber cable, as well as the fiber splice. The extra cable length will thus be available for future splicing operations, if required, and there is usually enough cable length for moving the splice out of the ground and into a vehicle during any future repair operations or tests.

Once the cable splice has been made, the extra length of fiber must be dealt with and is usually wound into a coil and placed in the manhole for safe keeping. However, problems have been found to arise when the cable is dug up by heavy excavating equipment along the cable path and the extra cable is pulled from the manholes on each side of the damaged cable site. In most cases, the slack extra cable that is left coiled up in the manhole will be pulled down the conduit used for the in-place fiber cable path, and will tend to kink as it enters the conduit, damaging the fiber cable and delaying the repair process.

Thus, a need remains in the art for an arrangement for storing spare fiber optic cable in a manhole location that will prevent the cable from kinking and blocking the conduit as it is pulled through.

SUMMARY OF THE INVENTION

The need remaining in the prior art is addressed by the present invention, which relates to hanging apparatus for slack fiber optic cable and, more particularly, to an "H"-shaped bracket for maintaining a coil of spare fiber in an enclosed location, such as a manhole.

In accordance with the present invention, the cable hanging bracket includes a pair of parallel, spaced-apart cross arms and a center post which may be attached to the floor of the manhole (or other cable-storing location). The extra fiber cable is then loosely wound around the cross arms, one arm extending toward each conduit exiting the manhole. Later, when the need arises to pull the extra fiber through the conduit (during a splice or other repair operation, for example), the raised loosely coiled fiber will easily unwind from one of the cross arms on the bracket and travel unimpeded along the conduit, thus avoiding the kinking problem of the prior art. The fiber cable may also be covered with a break-away plastic duct to further support the cable as it is drawn through the conduit.

In a preferred embodiment of the present invention, the hanging bracket comprises an angle iron constructed out of a heavy gauge steel, so as to be able to easily support the weight of (approximately) 50 feet of spare fiber optic cable. The bracket may comprise an "H"-shaped pair of cross arms for one side of the angle iron, the remaining leg of the angle iron extending downward to the floor of the manhole (or other cable storing area).

Other and further embodiments of the present invention will become apparent during the course of the following discussion and by reference to the accompanying drawings.

BRIEF DESCRIPTION OF THE DRAWINGS

Referring now to the drawings.

DETAILED DESCRIPTION

Figure 1:
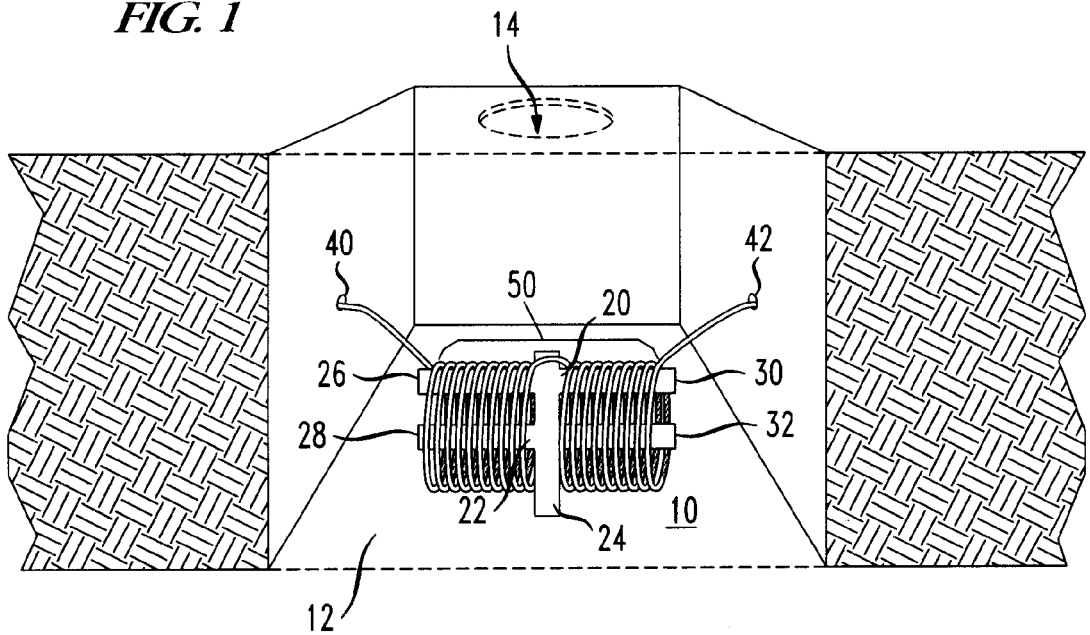
FIG. 1 illustrates an exemplary cable hanging bracket of the present invention as located in a manhole.
Figure 2:
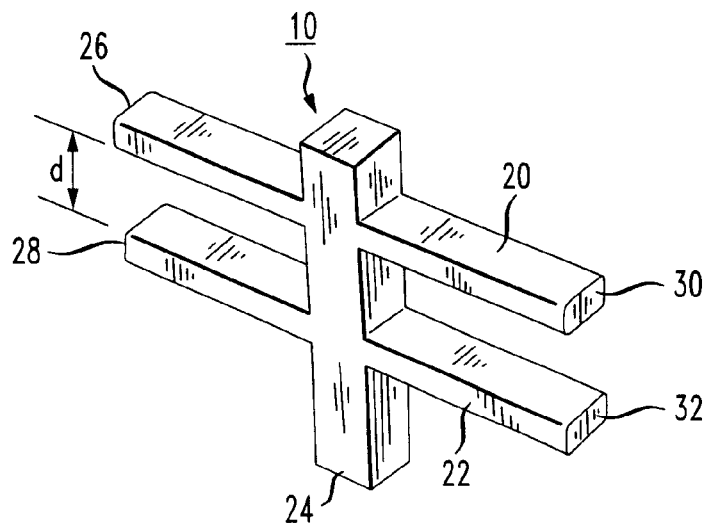
FIG. 2 illustrates in particular the cable hanging bracket of the invention.

FIG. 1 contains a diagram illustrating an exemplary cable hanging bracket 10 of the present invention, as disposed on the floor 12 of a manhole 14. As clearly illustrated in FIG. 2, cable hanging bracket 10 comprises a pair of parallel, spaced-apart cross arms 20, 22 supported by a downward-extending center post 24. Cable hanging bracket 10 is positioned in manhole 14 such that first ends (terminations) 26, 28 of cross arms 20, 22 are facing a first fiber cable conduit 40 and second ends (terminations) 30, 32 of cross arms 20, 22 are facing an opposing, second fiber cable conduit 42. In a preferred embodiment of the present invention, cable hanging bracket 10 is constructed out of heavy gauge steel and able to support the weight of the slack fiber cable.

In the arrangement as shown in FIG. 1, the extra length 50 of fiber cable remaining when two reels are spliced together is wound around the pair of cross arms 20, 22 so that the cable encircles both arms as it is wound. In accordance with the present invention, cross arms 20 and 22 are separated by a predetermined distance d (for example, four to six feet—an average of five feet being exemplary) sufficient to allow the cable to be wound without introducing bends or kinks in the coiled fiber (which would damage the fibers within the cable), the coils looping approximately seven to eight feet around cross arms 20 and 22.

Figure 3:
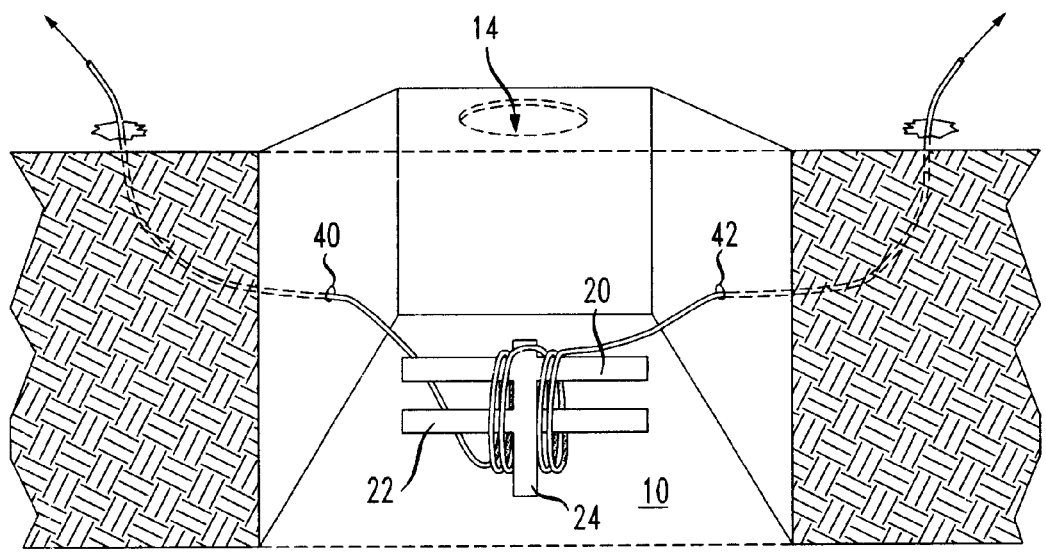
FIG. 3 illustrates the same arrangement as in FIG. 1, with a section of the spare fiber cable having been pulled away from the cable hanging bracket.
Figure 4:
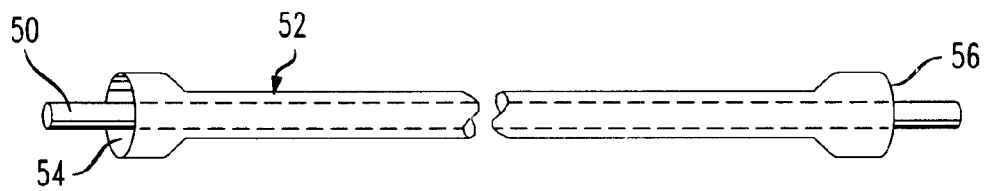
FIG. 4 illustrates an exemplary section of spare fiber cable formed to include a breakaway plastic supporting outer layer.
Figure 5:
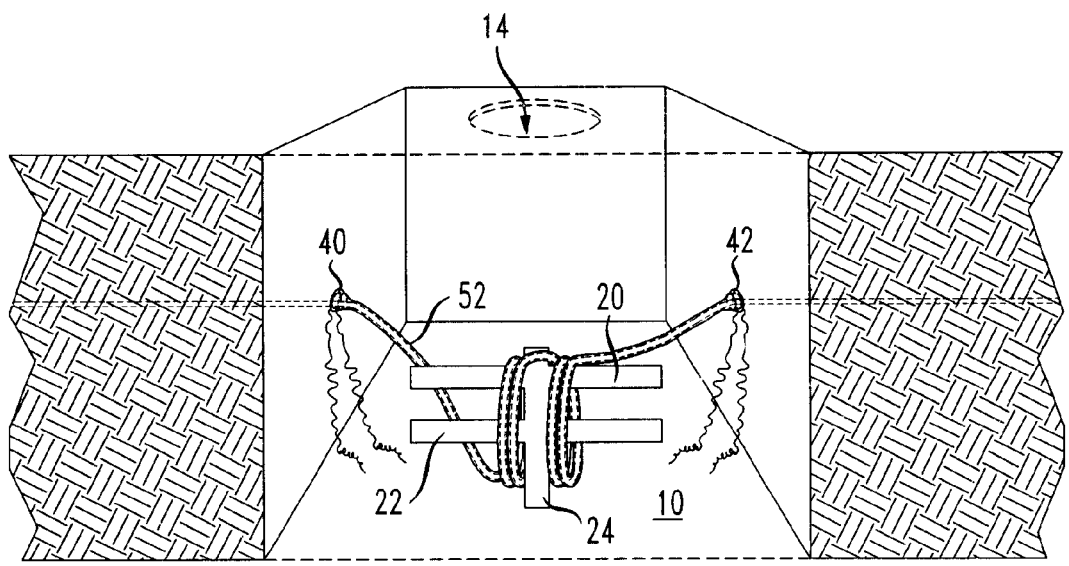
FIG. 5 illustrates an alternative embodiment of the present invention, including the utilization of breakaway duct material for covering spare fiber cable wound on the inventive cable hanging bracket.

When the need arises for the extra length 50 of fiber cable to be used, the cable may be drawn through one or both conduits 40 and 42, as shown in FIG. 3, where the use of cable hanging bracket 10 prevents the cable from kinking as it uncoils and is pulled through the conduits. In particular, the construction of hanging bracket 10 allows cable to be unraveled from opposite ends of the bracket without affecting the cable on the other end. To further support the fiber cable as it travels between cable hanging bracket 10 and conduits 40 or 42, breakaway plastic duct material 52 may be used to cover extra length cable 50, as shown in FIG. 4. Breakaway duct 52 is disposed to surround the fiber cable 50 prior to being wound around cable hanging bracket 10. FIG. 5 illustrates an exemplary section of fiber cable 50 covered with breakaway duct 52 and coiled onto cable mounting bracket 10. In this case, when the spare cable is pulled through conduit 40 (or conduit 42), breakaway duct 52 will provide additional support to the cable as it travels across the space between the end of bracket cross arms 20, 22 and the location of conduits 40,42. Once the edge 54 of duct 52 reaches conduit 40 (and similarly, edge 56 reaches conduit 42, as shown in FIG. 4), the material will begin to peel off, allowing the uncovered fiber optic cable 50 to travel freely through the conduit. The peeled away material can then simply be cut off by the repair personnel and thrown away.

It is to be noted that while the above discussion has focused on the use of the cable hanging bracket within a manhole location, the cable hanging bracket of the present invention may be used in virtually any location where spare fiber optic cable needs to be efficiently stored and then retrieved for later use. For example, basements of large office locations, raised floors in computer centers, and other areas which require a long expanse of fiber optic cable may also use the hanging bracket as described above. In particular, the scope of the present invention is intended to be limited only by the claims appended hereto.

What is claimed is:

1. An arrangement for supporting spare fiber optic cable within a manhole location, the manhole location defined as including, a manhole floor and a pair of opposing walls, with a pair of cable conduits formed in the opposing walls of the manhole, the arrangement comprising a cable hanging bracket comprising a pair of parallel, spaced-apart horizontally extending cross arms and a center post attached to the midpoint of said pair of cross arms and extending downward therefrom, wherein the termination of said center post is attached to the manhole floor and the termination of said cross alms are essentially aligned with the pair of cable conduits; and a breakaway duct material disposed to cover the spare fiber cable wound around the cable hanging bracket.

2. The arrangement as defined in claim 1 wherein the pair of parallel, spaced-apart cross arms of the cable hanging bracket are separated by a predetermined distance d.

3. The arrangement as defined in claim 2 wherein the predetermined distanced is within the range of four to six feet.

4. The arrangement as defined in claim 1 wherein the pair of parallel, spaced-apart cross arms and the center post of the cable hanging bracket comprise a heavy gauge steel.

\* \* \* \* \*